UNITED STATES PATENT OFFICE.

BERN L. BUDD, OF FAIRFIELD, CONNECTICUT.

IMPROVEMENT IN COMPOSITION ROUGE-PASTE.

Specification forming part of Letters Patent No. 190,126, dated May 1, 1877; application filed March 14, 1877.

*To all whom it may concern:*

Be it known that I, BERN L. BUDD, of the town and county of Fairfield, in the State of Connecticut, have invented a new and useful Composition Rouge-Paste, which composition is fully described in the following specification:

This invention relates to that class of composition used to put a high polish upon metals; and consists in a composition formed by mixing a carefully-prepared oxide of iron with the substance known as vaseline.

To prepare the rouge-paste I first take any quantity of a saturated solution of the salt of iron, known as the sulphate of iron, or, more commonly, as green vitriol, and add to this solution a sufficient quantity of a mixture of equal parts of nitric and sulphuric acids to render the solution positively acid. This I heat in a porcelain or glass vessel to the boiling-point, and then add a hot saturated solution of carbonate of soda. A brisk effervescence at once takes place, and as a result we have the following change: The sulphuric acid, which was before held in combination with the oxide of iron, is liberated, and having a superior affinity for the carbonate of soda, it unites with the soda, forming a solution of sulphate of soda, and throwing down a dense copious precipitate, red in color, formed of the carbonic acid previously in combination with the carbonate of soda and the oxide of iron which was contained in the green vitriol. This red precipitate is, of course, a carbonate of iron. This I collect upon a felt filter, and wash with water, so long as the washings show an acid reaction. Having thus carefully washed the precipitate, I next dry it thoroughly in a water-bath, after which I transfer it to a polished iron crucible, and heat the mass to redness. The effect of the heat is to drive off the carbonic acid, and to leave behind a pure powder of the oxide of iron. I then take of this carefully prepared oxide of iron and of vaseline equal parts, place them together in a porcelain dish over a water-bath, and apply heat with constant stirring, until the mass assumes a uniform temperature throughout. I then transfer it, in small quantities at a time, to a slab, which has been previously heated in boiling water, and with a muller, also previously heated, I levigate it until perfectly smooth and free from lumps.

I do not wish to be understood as confining myself to the proportions of oxide of iron and vaseline I have indicated. I have made the paste in a variety of proportions, and find them all good; but I give a preference to about the proportions specified.

Having thus described my invention, what I claim as new, and desire to secure by Letters Patent, is—

A composition of the oxide of iron and vaseline, substantially as and for the purpose specified.

BERN L. BUDD.

Witnesses:
  THOMAS C. CONNOLLY,
  SAML. GLOVER.